F. G. WINKELMAN.
AUTOMOBILE SIGNAL.
APPLICATION FILED SEPT. 7, 1917.

1,274,130.

Patented July 30, 1918.

UNITED STATES PATENT OFFICE.

FRED G. WINKELMAN, OF QUARRY, WISCONSIN.

AUTOMOBILE-SIGNAL.

1,274,130.     Specification of Letters Patent.     Patented July 30, 1918.

Application filed September 7, 1917. Serial No. 190,269.

*To all whom it may concern:*

Be it known that I, FRED G. WINKELMAN, a citizen of the United States, and a resident of Quarry, in the county of Manitowoc and State of Wisconsin, have invented certain new and useful Improvements in Automobile-Signals; and I do hereby declare that the following is a full, clear, and exact description thereof.

My invention belongs to that general class of devices known as indicators, and relates particularly to an indicator for use on vehicles for indicating the intended change in direction of travel of the vehicle. It is customary, particularly with motor vehicles, for the operator, or someone in the vehicle, to extend a hand from one side of the vehicle to indicate that the same is going to turn to that side or in the indicated direction. This is in many cases not only very inconvenient, but also often a cause and excuse for accidents, since, if the driver gives the signal, one of his hands is taken away from the controlling mechanism when it might be required in an emergency. Usually the signal is intended to warn those at the rear or following, but with the present invention it also affords a signal to an approaching vehicle as well. It may be set or displayed whenever desired so that the other vehicles may have timely notice of the intended change in the direction of travel.

The invention has among its objects to so construct a device of the kind described that will provide together with the indicating mechanism, a glare protector and also mirrors whereby the operator of a vehicle may be able to see any vehicles approaching from the rear.

A further object of the herein described invention is to provide a novel form of connector for the sectional body which will have means for cushioning the return of the indicating mechanism; and a more specific object of this invention is to provide an adjustable glare protector carried by the body member.

With the above and other objects in view which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing I have illustrated one complete example of the physical embodiments of my invention constructed according to the best mode I have so far devised for the practical application of the principles thereof, in which.

Figure 1:
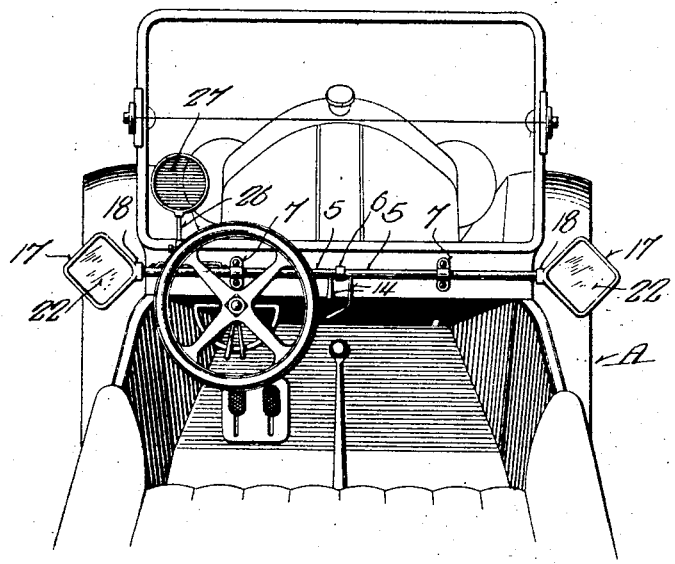
Figure 1 is a perspective view of the forward portion of an automobile equipped with my device, said view being taken looking downward and forward of the machine.
Figure 2:
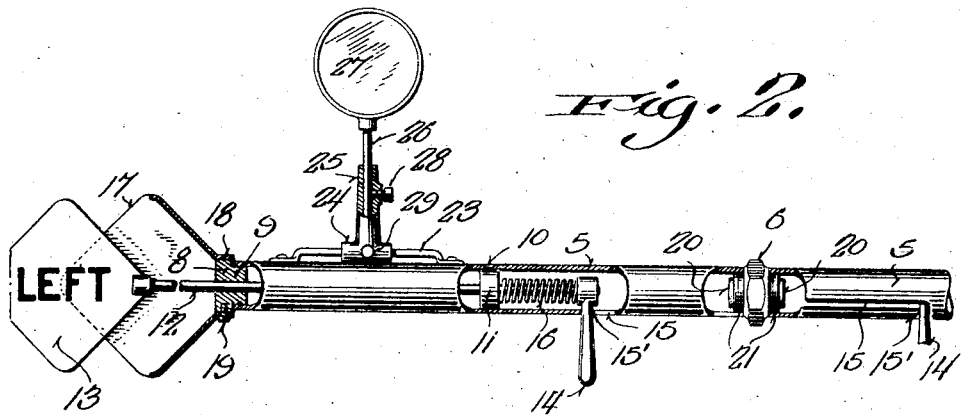
Fig. 2 is an elevational view of a portion of my device, with parts broken away and in section to more clearly illustrate details of construction.
Figure 3:
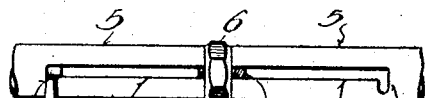
Fig. 3 is a detailed elevation of a portion of my device.

Referring now more particularly to the accompanying drawing, the body of the signal comprises a two part pipe section 5 connected by means of a coupling 6 and secured to the dash board of an automobile or other vehicle A by means of suitable brackets 7, and closing each outer end of the sections 5 is a centrally apertured plug 8 having its inner end 9 reduced and screw threaded to engage the internal threads of said sections 5.

Secured in each section 5, intermediate the ends thereof, by means of a suitable fastening 10 is a centrally apertured partition 11, and slidably mounted in the aperture of each partition 11 and plug 8 is a signal rod 12 carrying at the outer end thereof a suitable signal or indicating member 13 and at its inner end a handle 14 projecting outwardly through a longitudinal slot 15 in the sections 5, an expansile spring 16 engaging each signal rod 12 between the handle 14 and partition 11 to normally hold the signal 13 inwardly.

Each indicator 13, when in retracted position, is housed by a casing 17 which has one end closed and carries at said end a sleeve 18 which fits on the enlarged portion of plug 3 and is secured thereto as by the screw 19.

The indicators 13 have thereon suitable indicating symbols, as in this instance "left" and "right," and when it is desired to turn to the left the operator moves the handle 14, to the left of the machine, outwardly to the limit of slot 15 when the handle is slipped downwardly into key hole slot 15′ whereby the signal is held outwardly against the action of spring 16. When it is desired to return the signal to non-indicating position, in casing 17, the handle 14 is moved out of key hole slot 15' whence spring 16 will return the signal to casing 17, a suitable cork, felt or other pad 20 being carried by each end or socket 21 of the coupling 6 whereby the jar or shock of the returning signal is reduced to a minimum as will be obvious.

Each casing 17 has formed on the rear face thereof a mirror or a reflector 22, and the casings 17 are slightly inclined in order that the mirrors may be focused so that the driver will be able to see objects in the rear thereof, and will be readily apparent when the indicators 13 are first moved from out their casing 17, they are also on an incline, but when the handle 14 is moved into the key hole 15' they will be adjusted to a true vertical position.

Secured to the section 5, directly in front of the driver of the vehicle, is a longitudinal bracket 23 upon which is slidably mounted the horizontal portion 24 of an inverted T member which has its vertical leg 25 centrally apertured for the reception of a standard 26 having mounted at its upper end a suitable colored glass or glare protector 27, and as will be readily apparent the standard 26 is held at its proper adjustment in leg 25 by means of a set screw 28 and the inverted T member is retained in its proper transverse adjustment by means of a similar set screw 29. As the operation of this glare protector will be at once apparent to those skilled in the art to which an invention of this character appertains further description is thought unnecessary.

From the foregoing description taken in connection with the accompanying drawing the operation and advantages of my invention will be at once apparent and it will be understood that while I have not illustrated the indicating mechanism as being illuminated, it will be understood that I reserve the right to place suitable lighting means such as electrical lamps for displaying the same at night.

I claim:

In a signal of the class described, the combination with a pair of like hollow pipe sections having their inner ends longitudinally slotted, of a coupling for joining the inner ends of said sections, a centrally apertured plug closing the outer ends of each section, a centrally apertured partition secured in each section intermediate the ends thereof, a signal rod slidably mounted in each section and engaging the apertures of said partitions and plugs, said rods having their outer ends outward of said plugs and their inner ends inward of said partitions, an indicator carried by the outer end of each signal rod, an operating handle carried by the inner end of each signal rod and projecting outwardly of the sections through the longitudinal slot there adjacent, casings each having one end open and secured to said sections at the outer ends thereof to receive the indicators when in retracted position, an expansile spring surrounding each signal rod intermediate the handle and partition whereby to normally urge said signal rod to retracted position, said longitudinal slots having each a key hole slot communicating therewith to receive said handle when the signal rod is in retracted position to hold the same against the tension of the spring thereof, and a cushioning pad carried by a socket formed on each end of said coupling whereby to cushion the return of the signal rod by said spring substantially as described.

In testimony that I claim the foregoing I have hereunto set my hand at Quarry, in the county of Manitowoc and State of Wisconsin.

FRED G. WINKELMAN.